FIG. 1

INVENTOR.
ERIC C. HOPKINSON
BY E. F. Bard
HIS ATTORNEY

FIG. 3

INVENTOR.
ERIC C. HOPKINSON
BY
HIS ATTORNEY

INVENTOR.
ERIC C. HOPKINSON
BY
*E. F. Bard*
HIS ATTORNEY

United States Patent Office 3,176,136
Patented Mar. 30, 1965

3,176,136
CONTROL SYSTEM FOR ARTIFICIAL SOURCES OF RADIATION
Eric C. Hopkinson, Houston, Tex., assignor, by mesne assignments, to Dresser Industries, Inc., Dallas, Tex., a corporation of Delaware
Filed Sept. 29, 1961, Ser. No. 141,823
11 Claims. (Cl. 250—84.5)

This is a continuation-in-part of the co-pending application for U.S. Letters Patent, Serial Number 752,701, filed August 4, 1958, now abandoned, for "Control System for Artificial Sources of Radiation."

This invention relates to artificial sources of radiation and is particularly directed to novel means for controlling the radiation output flux of artificial sources of radiation.

As the field of radiation physics has developed, innumerable uses have been found for the various nuclear and atomic radiations. Moreover, since natural sources of radioactivity are relatively rare and usually emit several types of radiation of different energies simultaneously rather than a pure beam of a single desired type and energy, it has been found desirable to develop artificial sources of radiation. Several different types of artificial sources of radiation have been developed, such as the neutron source utilizing the deuterium-tritium reaction which is described in U.S. Letters Patent No. 2,689,918, issued September 21, 1954, to A. H. Youmans, and have been found to be superior to natural sources in many respects. For example, the artificial sources may be turned off when not in use and, consequently, eliminate radiation hazards during handling, shipping and other similar periods. Moreover, artificial sources permit aiming and focusing of the radiation and many such sources emit radiations having considerably greater energies than similar radiations emitted by natural sources. Further, such sources may be made to emit substantially a pure beam of radiations of a single type and energy.

Unfortunately, the radiation output flux of these artificial sources is not constant but, instead, may be affected by changes in any of several electrical or environmental parameters as well as by changes in the gas pressure in the ion source, gas or target composition, or other variables depending upon the type of source employed. Naturally, precautions are taken to avoid the effect of these variations insofar as possible. The devices employed heretofore for this purpose have attempted either to prevent the variable from changing or to compensate for changes in the variables. However, it is possible that some of these devices may fail during operation which would allow the radiation output flux to vary without the knowledge of the operator. Also, some of the variables cannot be stabilized. Thus, even with the stabilizing devices of the prior art, the operator cannot be certain of the value of the radiation output flux.

In the field of radioactivity well logging, this problem is usually severe. The artificial source of radiation must be housed in a subsurface well logging instrument suspended in a borehole which may be several miles deep. Moreover, as the instrument traverses the borehole, it is subjected to severe mechanical shocks and may encounter temperatures of the order of 400° F. Under these circumstances, the problems of stabilizing the radiation output flux of the artificial source is peculiarly difficult and is not solved with the devices of the prior art. Furthermore, the stabilizing circuits of the prior art are generally mounted completely in the subsurface instrument and, consequently, are subjected to the same conditions as the artificial source. Thus, instead of stabilizing the output of the artificial source, such circuits may actually introduce additional errors.

Artificial neutron sources, such as that disclosed in the aforementioned Youmans patent, have their neutron output effected by several factors including the potential between the electrodes that serve to ionize the deuterium and the potential between the tritium-containing target and the ionization region. Various proposals have been made in the prior art for utilizing signals obtained by monitoring neutron output to control this latter potential, called the "accelerating gap voltage," and thereby stabilize neutron output. Such proposals have a number of disadvantages. One is that small changes in accelerating gap voltage produce relatively large changes in neutron output. Another disadvantage is that use of this control method precludes the connection of the artificial neutron source to a high voltage electrostatic power supply, such as a Van de Graaff generator, employing corona current as a means of voltage regulation.

Accordingly, it is an object of the present invention to provide effective means of improved sensitivity for stabilizing the radiation output flux of an artificial source of radiation.

Another object is to provide radiation output stabilizing means capable of use in the combination of an artificial neutron source with a high voltage power supply, such as a Van de Graaff generator, employing corona current as a means of output voltage regulation.

A further object of the invention is to provide a radioactivity well logging system wherein the radiation flux output of an artificial source of radiation adapted for positioning within a wellbore is stabilized by means remote from said source and responsive to a signal from means monitoring said radiation flux output whereby variations in radiation output flux are compensated for and the amount of such flux is recorded.

Still another object is to provide a radioactivity well logging system including an artificial neutron source wherein one of the factors effecting neutron output is stabilized while another of such factors is varied in response to monitored neutron output to compensate for variations in such output.

Still another object is to provide a novel method for stabilizing the output of an artificial source of radiation.

These and other objects of the invention are attained, in general, by providing an artificial radiation source composed of an ion beam accelerator powered by an electrostatic high voltage power supply having corona current control means for regulating its output voltage. The accelerating gap of the accelerator is so connected to the power supply that the voltage across the accelerating gap is substantially equal to the corona voltage and so is effectively stabilized at a fixed value during operation. Variations in the flux of radiation produced by the accelerator are compensated for by changing the current flow to the anode of the accelerator in response to a signal obtained from an output monitoring detector. The invention thus has the advantages over the prior art of providing for control of two factors, anode current and accelerating voltage, effecting radiation output rather than control of accelerating voltage alone thus improving output stability and of providing control means of improved selectivity since relatively larger changes in anode current are required to produce a given change in radiation output as compared to changes in accelerating voltage required to produce the same output change.

The various objects and features of the present invention will be apparent from the following description wherein reference is made to the figures of the accompanying drawings.

Figure 1:
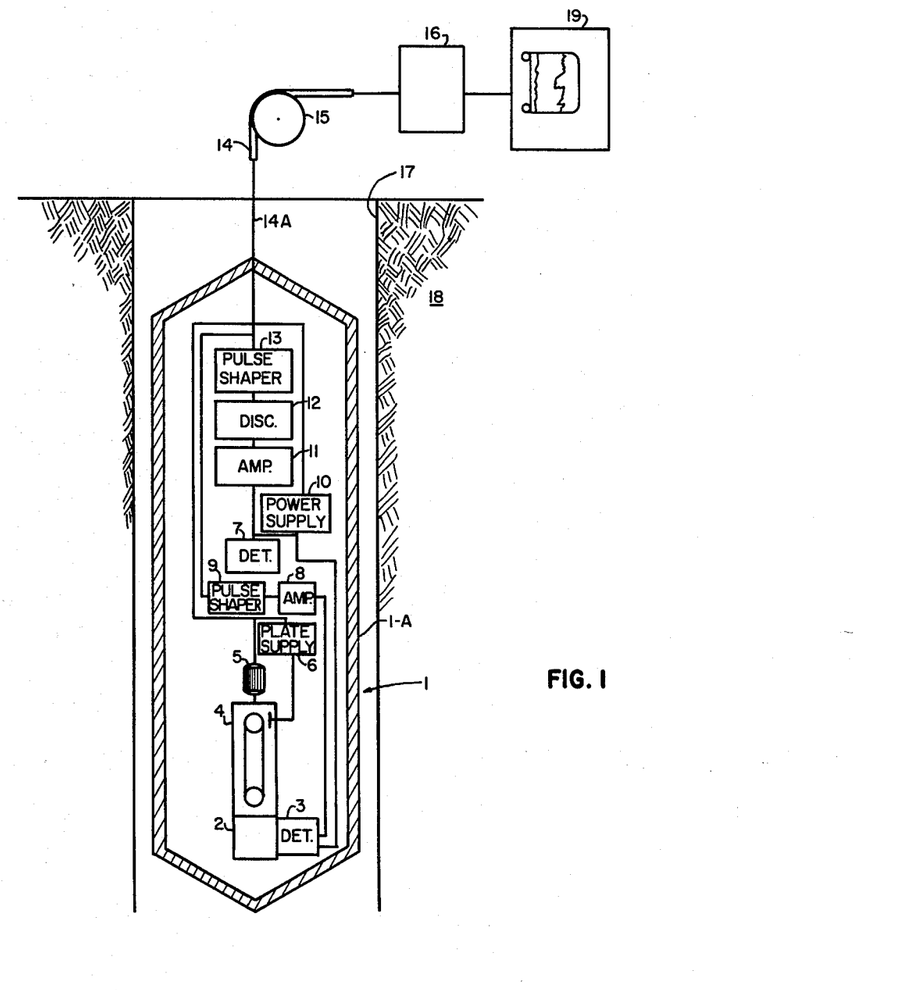
FIG. 1 is a view, partly in section, of a typical radioactivity well logging instrument embodying the present invention.

Referring now to FIG. 1, there is depicted a well logging instrument 1 suspended in a borehole 17 by means of a cable 14 containing a conductor 14A which, in turn, is connected to various control equipment 16 and recording apparatus 19 for producing a graphic record of the characteristics of the earth 18 together with a correlative indication of depth. This depth indication may be derived from the operation of a measuring wheel 15, from which the cable 14 is suspended, and over which the cable 14 and instrument 1 may be drawn by a means not depicted in FIG. 1. The measuring wheel 15 may be suspended in any convenient manner, such as by a traveling block supported over the borehole 17 by a derrick.

The logging instrument 1 depicted in FIG. 1 includes an elongated and pressure-resistant housing 1–A of the type generally used for sub-surface exploration. Contained in the housing 1–A there is shown schematically an artificial source of radiation which may include an ion beam accelerator tube 2 of the type generally described in the aforementioned U.S. Patent No. 2,689,918, issued to A. H. Youmans, and which may be energized by means of electrostatic high voltage power supply means such as a Van de Graaff generator 4. The details of the operation of the accelerator tube 2 and the Van de Graaff generator 4 will be explained in relation to FIG. 2. FIG. 1 depicts only the motor 5 and the induction plate supply 6 which serve to energize the generator 4, and which are themselves energized by a source of power which may be delivered thereto by means of the conductor 14A of cable 14 connected to the control equipment 16. The recordable signal, which is expected to eventually reach the recording apparatus 19, originates at the logging detector 7. The logging detector 7, which may be a scintillation counter, is itself energized by a detector power supply 10. The output of the logging detector 7 may be delivered to a pulse amplifier 11, a discriminator 12 for elimination of noise pulses, and then to a pulse shaper circuit 13, for transmission via the cable 14 to the control equipment 16 and recording apparatus 19. Also depicted in FIG. 1 is a monitor detector 3 of suitable design which is mounted close to the accelerator tube 2. This monitor detector 3, the function of which will be explained hereinafter in detail, may be energized by the detector power supply 10, and is preferably arranged to deliver its output signal to a monitor pulse amplifier 8, and to a pulse shaper and cable driving network 9, before being connected to the conductor 14A as hereinafter explained.

Figure 2:
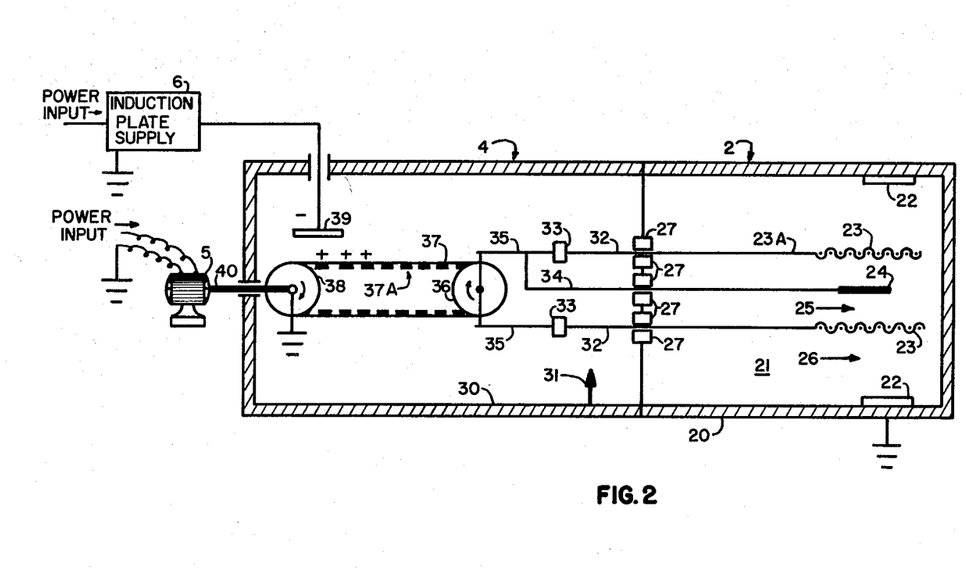
FIG. 2 is a diagrammatic representation of the high voltage power supply and source of radiation depicted generally in FIG. 1.

Referring now to FIG. 2, there is depicted in schematic form the components and circuitry hereinbefore referred to generally as the source of radiation, and composed of the accelerator tube 2, the Van de Graff generator 4, the motor 5, and the induction plate supply 6. As shown, the accelerator tube 2 includes a jacket 20 which encloses a substantially pure deuterium atmosphere 21 at a very low pressure. Disposed generally at the axial center of the accelerator tube 2 is an ionization supply composed of an anode 24 preferably in the form of a single wire, and a surrounding cathode 23 having generally the form of a cylindrical fine wire mesh or screen positioned at one end of supporting tube 23A and inside mounted on the jacket 20 is a ring-shaped target 22 which is generally formed of a thin strip or belt of a tritium-impregnated metal such as titanium or zirconium.

The Van de Graaff generator 4 is composed of a tank 30 which is electrically connected to jacket 20 through ground and which is adapted to house a so-called "upper" pulley 38 and a "lower" pulley 36. The two pulleys are arranged to drive a continuous belt 37, which is formed of a non-conductive material such as leather or cloth, but which contains small, regularly sized and spaced segments 37A of a conductive substance mounted thereon as shown in FIG. 2. The upper pulley 38 may be connected, for rotation purposes, to the motor 5 by means of a drive-shaft 40 or some other suitable linking means. Near the lower pulley 36 there is arranged a two-section electrode assembly hereinafter referred to as the upper hollow electrode 35 and the lower hollow elecrode 32. As functionally represented in FIG. 2, the upper hollow electrode 35 is connected by means of conductor 34 to the anode 24 in the accelerator tube 2, and the lower hollow electrode 32, which is insulated from the upper hollow electrode 35 by means of an insulator 33, is connected through an insulating socket 27 to the cathode 23.

The induction plate supply 6 shown in both FIG. 1 and FIG. 2 is interconnected to apply a high negative voltage to the induction plate 39 to cause the upper pulley 38 to become positively charged in response thereto. When the motor 5 is caused to rotate the upper pulley 38, the continuous belt 37 is caused to carry the positive charge on the aforementioned segments 37A of conductive substance from the upper pulley 38 to the lower pulley 36. From the lower pulley 36 the positive charge is conducted to the anode 24 by means of the lower hollow electrode 35 and the conductor 34. Thus, the anode 24 is caused to become increasingly positively charged by the operation of the Van de Graaff generator 4, with respect to both the cathode 23 and the target 22. However, when the charge borne by the anode 24 reaches a certain magnitude, there develops an electron flow through ionization region 25 between the cathode 23 and the anode 24 which serves to ionize the deuterium of atmosphere 21 contained therein. These positively charged ions are attracted towards and through the relatively negatively charged cathode 23 and, due to the high potential established between the highly positively-charged anode 24 and the grounded target 22, are accelerated across the so-called "accelerating gap" 26 into the tritium-impregnated target 22. When the accelerator tube 2 is operated properly, these accelerated deuterium ions will bombard the tritium at velocities such as to produce high energy neutrons in substantial numbers by means of the well known "deuterium-tritium" reaction.

In addition to the "beam current" (ion flow) across the accelerating gap 26, there may also be developed, in generators of the type herein depicted, a "corona current" between the lower hollow electrode 32 and the Van de Graaff generator tank 30. Since the lower hollow electrode 32 is not only electrically isolated from the upper hollow electrode 35, but is also isolated from "ground," the potential at the lower hollow electrode 32 rises with respect to "ground" during the aforementioned ionization of the deuterium atmosphere 21 within the ionization region 25, until a current flow develops between the lower hollow electrode 32 and either the jacket 20 of the accelerator tube 2, or the tank 30 of the generator 4, or both. Thus, in order to achieve stability of the "beam current," a sharp pointed electrode, which is hereinafter referred to as the "corona point" 31, is preferably adjustably disposed within the tank 30 at a location opposite the lower hollow electrode 32. Since the gap between the lower hollow electrode 32, and the corona point 31, is narrower than between the lower hollow electrode 32 and any other grounded point in the generator 4, all of the leakage current flow between the lower hollow elecrodet 32 and "ground" (except for the beam current) will be developed across this "corona gap" between the corona point 31 and the adjacent section of the lower hollow electrode 32. As is well known in the art, it is an inherent characteristic of any corona current that current flow is negligible until the voltage is brought to a certain magnitude $V_c$, but that voltage increases above $V_c$ develop increasingly large magnitudes of current. Thus, if the voltage established across the "corona gap" is substantially greater than $V_c$, fluctuations in current flow between the corona point 31 and the lower hollow electrode 32 will produce only relatively slight fluctuations in the voltage established across the "corona gap." Since the corona voltage is equal to the accelerating voltage across the accelerating gap 26 because corona point 31 and target 22 are electrically connected to one another through ground and thus are at the same potential, and since cathode 23 and lower hollow electrode 32 are also of the same potential, the voltage across accelerating gap 26 is thereby effectively stabilized.

The intensity of the neutron radiation provided by the acceleration tube 2 is dependent upon many factors such as the purity and pressure of the deuterium atmosphere 21, the concentration of tritium in the target 22, the magnitude of potential established across accelerating gap 26 and the magnitude of the current flowing to the anode 24. The present invention is not concerned with affecting or controlling the tube atmosphere 21, nor is it concerned with the tritium concentration in the target 22, since these problems usually arise because of structural defects in the equipment. Variations in the potentials established across the ionization region 25 and the accelerating gap 26 are frequently due to the fact that the well logging instrument 1 must often be operated thousands of feet below the surface of the earth and under extremely high temperatures and pressures. Heretofore, it has been the practice in the industry to attempt to regulate the ouput of an artificial source of radiation, such as the accelerator tube 2, by adjusting the potential established across the accelerating gap 26. However, if the accelerator tube 2 is employed with a high voltage power supply such as the aforementioned Van de Graaff generator 4, which incorporates means for stabilizing accelerating voltage, this is impractical since the corona current, which provides such stabilization, developed at the corona point 31 is effective to stabilize the potential across the accelerating gap 26. On the other hand, it has been found that the neutron output of the accelerator tube 2 is a direct function of the magnitude of the current flowing to the anode 24. Consequently, the neutron output of the accelerator tube 2 may be effectively stabilized by monitoring the neutron output, and providing means responsive to any change in such output to vary the anode current, that is, the current to anode 24 in accordance with such change in neutron output. Thus, the stabilizing advantage provided by the corona current is not disturbed by adjusting the magnitude of the current passing to the anode 24. Moreover, even if the corona current be eliminated, the present invention affords greater selectivity of control because relatively slight changes in the acceleraitng voltage produce relatively large changes in the neutron output of the accelerator tube 2. However, changes in the magnitude of the current delivered by the generator 4 to the anode 24 produce proportionately smaller changes in neutron output by the accelerator tube 2, and therefore greater selectivity of neutron output control may be achieved by the present invention.

Figure 3:
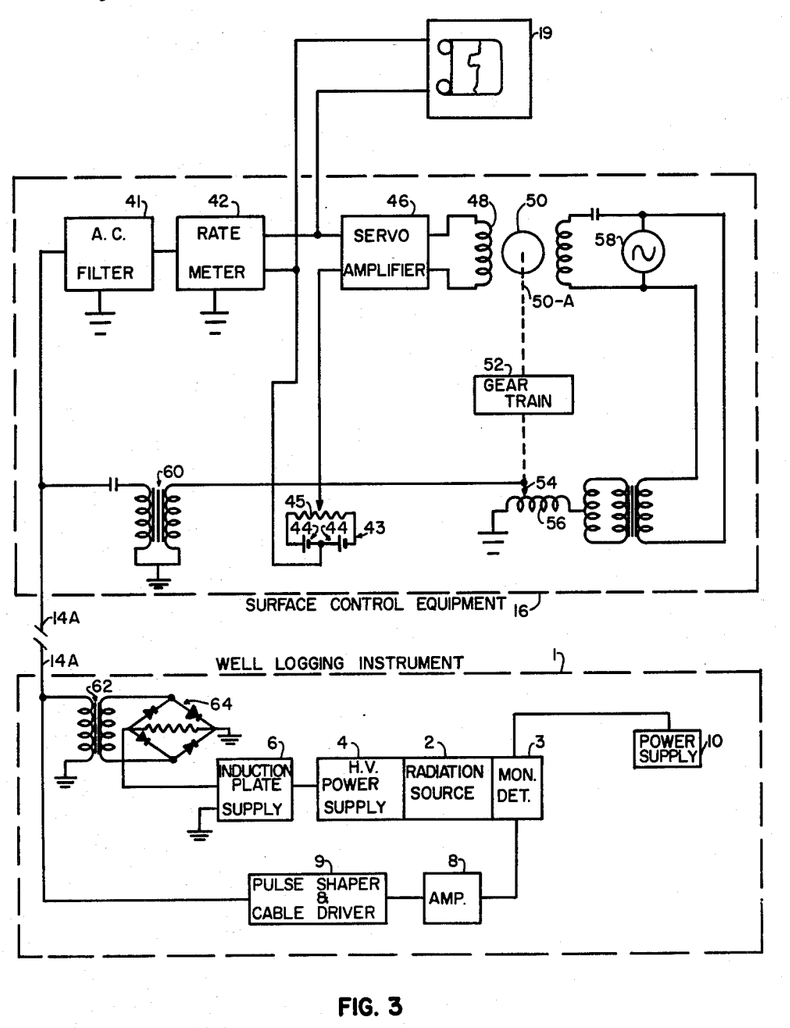
FIG. 3 is a diagrammatic representation of the circuitry and components which generally compose one form of the present invention.

In the embodiment of the present invention illustrated in FIG. 3 the monitor detector 3 is preferably mounted immediately adjacent the accelerator tube 2, or as close thereto as possible, and may be an ionization chamber, a Geiger or proportional counter, a scintillation counter, or any type of detector which emits electrical signals generally indicative of the number of radiations incident on the detector. Signals from the monitor detector 3 are passed to a suitable signal processing circuit comprising the monitor amplifier 8 and a pulse shaper and cable driver circuit 9, where the signals are shaped, amplified or otherwise prepared, and are then applied to the conductor 14A. If desired, these signals may be multiplexed with one or more of the signals from the logging detector 7 (see FIG. 1) for simultaneous transmission over conductor 14A. Numerous circuits for accomplishing such multiplexing have heretofore been suggested. However, such circuits form no part of the present invention. Thus, for simplicity the circuitry shown in FIG. 3 illustrates the present invention employing an individual conductor 14A in the cable 14 for the monitoring circuit.

At the surface, the monitor pulses may be passed, through a suitable A.C. filter 41, to a counting rate meter 42 which converts the monitor pulses to a D.C. signal suitable for recording by means of the recorder 19. The output voltage of the counting rate meter 42 is also applied to a comparison circuit 43 where it is compared with a fixed D.C. reference voltage provided by batteries 44 or some other suitable means. The comparison circuit 43 preferably includes a variable resistor 45 which serves as an output flux control adjustment which may be adjusted to vary the balance point of the comparison circuit 43. If desired, the resistor 45 may be calibrated for convenience in terms of neutron output.

When the voltage output of the counting rate meter 42 equals that of the batteries 44, no current will flow from the comparison circuit 43. However, if the voltage from the counting rate meter 42 differs from the reference voltage output from the batteries 44, in either magnitude or polarity, current will flow from the comparison circuit 43 to a servo amplifier 46 where it is preferably amplified and supplied to the control winding 48 of a two phase motor 50. In accordance with the polarity and magnitude of the output of the comparison circuit 43, the motor 50 is caused to drive suitable gearing 52 which, in turn, positions the wiper arm 54 of a variable transformer 56. The transformer 56, which is supplied with alternating current from a suitable A.C. source 58, develops an A.C. signal having an amplitude determined by the position of the wiper arm 54 and related in magnitude to the magnitude and polarity of the D.C. current supplied by the comparison circuit 43 to the servo amplifier 46. The A.C. signal from transformer 56 is then coupled by suitable means 60, shown as a transformer, to the monitor system conductor of the cable 14 and is transmitted to the well logging instrument 1.

In the well logging instrument 1, the A.C. signal is removed from the cable 14 by some suitable means 62, shown in FIG. 3 as a transformer, and then may be passed through some suitable rectification means 64, such as the bridge circuit depicted in FIG. 3, before being applied to adjust the output voltage being applied by the variable induction plate supply 6 to the Van de Graaff generator 4 induction plate 39. As hereinbefore stated, varying the potential applied to the induction plate 39 produces a related variation in the charge developed on the belt 37 which, consequently, produces a related variation in the neutron output of the accelerator tube 2.

It will be noted from the foregoing description, that only the monitor detector 3, its power supply 10, the amplifier 8 and pulse shaper circuit 9, and the variable induction plate supply 6 are mounted in the well logging instrument 1. These components must necessarily be mounted in proximity to the accelerator tube 2. On the other hand, all other components of the stabilizing circuit are mounted at the surface of the earth, as shown in FIG. 3. Consequently, they will not be affected by the mechanical shocks, high temperatures and other influencing factors to which the subsurface equipment will be subjected. Therefore, they can better provide true and accurate compensation for variations in the radiation output flux of the artificial source.

To illustrate the operation of the control system generally depicted in FIG. 3, when the apparatus is turned on, the induction plate supply 6 applies a negative potential to the induction plate 39 (see FIG. 2). This induces a charge on the belt 37 of the Van de Graaff generator 4 which is supplied to the anode 24, of the accelerator tube 2, by way of the lower pulley 36 and lower hollow electrode 35. When the accelerator tube 2 is energized in this manner, it emits neutrons at a substantially constant rate as hereinbefore explained. A representative number of these neutrons, or the instantaneous gamma rays caused by the neutrons, will be detected by the monitor detector 3 which will emit a pulse-type signal generally indicative of the intensity of the neutron flux. The signal from detector 3 will be processed by the monitor pulse amplifier 8, and the pulse shaper and cable driver circuit 9, and will then be impressed on the conductor 14A for transmission to the surface of the earth. At the surface, the monitor signal passes through A.C. filter 41 to the counting rate meter 42 where it is converted into a D.C. signal having a magnitude indicative of the magnitude of the neutron flux. This D.C. signal, which may be recorded by the recorder 19, is passed to the comparison circuit 42 where it is compared across the sensitivity adjustment resistor 45 with a D.C. reference signal from batteries 44.

If the neutron flux emitted by the acceleration tube 2 corresponds to that indicated by the setting of the sensitivity adjustment resistor 45, the current from the counting rate meter 42 will just equal the current from batteries 44 appearing across the resistor 45. Consequently, no current will flow through the servo amplifier 46 and an A.C. signal, which is being sent to the well logging instrument 1, will remain unchanged. Thus, the neutron flux emitted by the acceleration tube 2 will remain at the selected value until some system parameter becomes altered.

If, as the well logging instrument 1 traverses the well 17, the borehole temperature or some other parameter changes sufficiently to affect the neutron output, the change will be detected by the monitor detector 3 and will be indicated in its pulse type signal which, consequently, will alter the magnitude of the D.C. signal emitted by the counting rate meter 42. When this occurs the balance of currents in the comparison circuit 43 will be disrupted and the comparison circuit 43 will produce a current having a magnitude indicative of the extent of neutron output change, and having a polarity indicative of whether the neutron output change was an increase or a decrease. Passage of this unbalanced current through the servo amplifier 46 will energize the motor 50 according to the polarity and voltage of the comparison circuit 43 output, and thus cause it to accordingly adjust the position of the wiper arm 54 of variable transformer 56 to alter the amplitude of the A.C. signal in a manner inversely corresponding to the change in the neutron output from the acceleration tube 2. Thus, if the neutron flux emitted by the acceleration tube 2 is reduced, the position of wiper arm 54 will be altered to decrease the amplitude of the A.C. signal. Conversely, if the neutron output of the accelerator tube 2 is increased, the position of the wiper arm 54 will be altered to increase the amplitude of the A.C. signal. This modified A.C. signal is applied to the conductor of the cable 14 and is transmitted down the cable to the well logging instrument 1 where it is removed from the cable 14 and applied to the variable induction plate supply 6. If the neutron output of the acceleration tube 2 has been decreased, the amplitude of the A.C. signal reaching the induction plate supply 6 will be decreased as hereinbefore described. This causes the output voltage of the induction plate supply 6 to be increased which increases the potential on the induction plate 39 and, consequently, increases the current supplied by the Van de Graaf generator 4. As a result of the increased output of the Van de Graaff generator 4, the neutron output of the acceleration tube 2 is increased. This continues until the currents compared by the comparison circuit 43 are again in balance. Similarly, if the neutron output of the acceleration tube 2 has increased above the desired level, the amplitude of the A.C. signal reaching the induction plate supply 6 will be increased. This will reduce the output voltage of the induction plate supply 6 and will lower the potential on the induction plate 39. Consequently, the current delivered by the Van de Graaff generator 4 will be lowered and the neutron output of the acceleration tube 2 will be reduced. As described above, this reduction will continue until the currents in the comparison circuit 43 become balanced.

Figure 4:
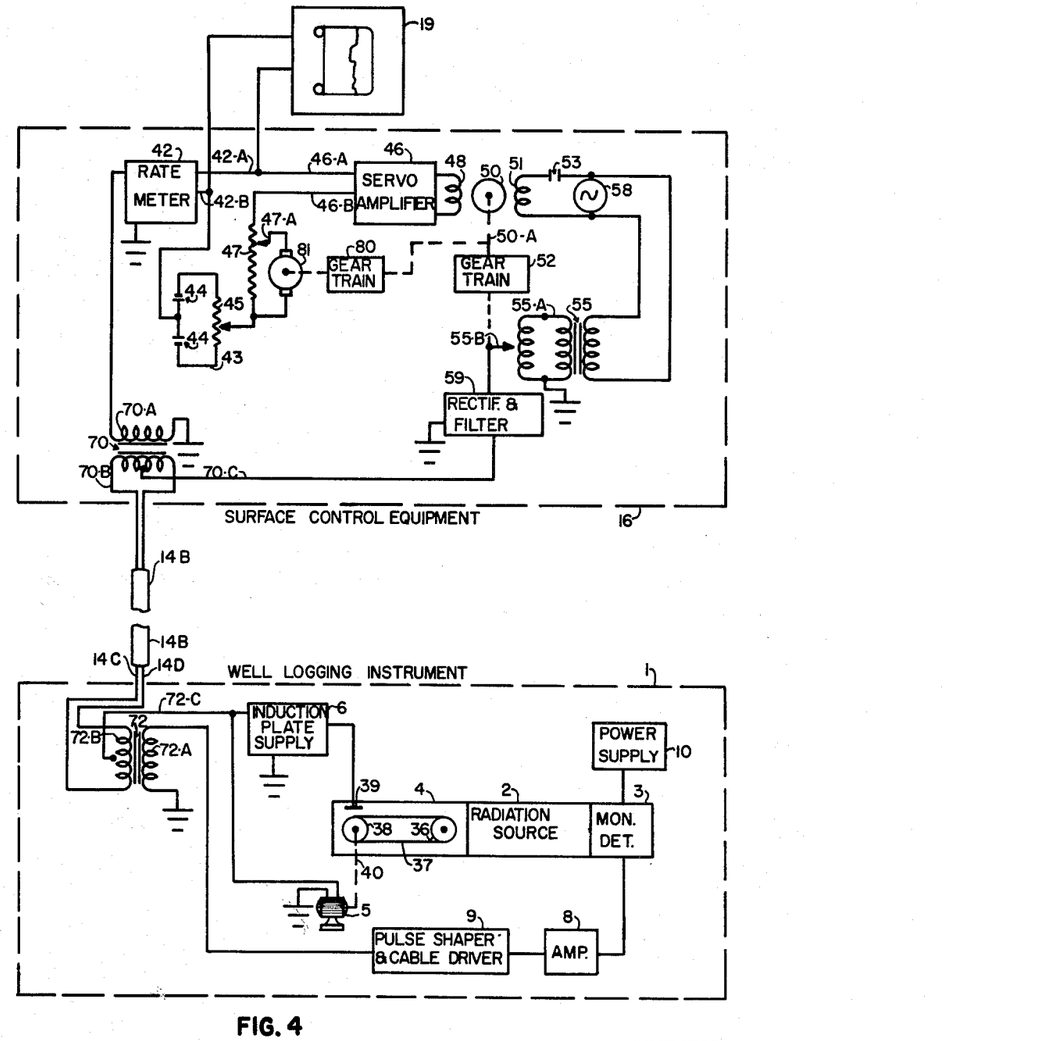
FIG. 4 is a diagrammatic representation of the circuitry and components which generally compose another form of the present invention.

Referring now to FIG. 4, there is shown another embodiment of the present invention wherein anode current is varied in a different manner. Depicted components include the accelerator tube 2, monitor detector 3, detector power supply 10, monitor amplifier 8, and the pulse shaper and cable driver circuit 9 hereinbefore described. The output signal of the monitor detector 3, which is representative of the intensity of radiation output provided by the accelerator tube 2, is sent to the high impedance winding 72–A of a first balanced line transformer 72 located within the well logging instrument 1. The monitor signal is then coupled to conductors 14C and 14D of the cable 14B by means of the low impedance winding 72B of the transformer 72 for delivery to the surface of the earth. At the surface, the monitor signal is taken from the conductor of the cable 14B by the low impedance winding 70B of a second balanced line transformer 70 located in the surface control equipment 16. The pulses related to the monitor pulses received by the low impedance winding 70B may be sent from the high impedance winding 70A, of the second balanced line transformer 70, to the count rate meter 42 generally as hereinbefore explained. At the count rate meter 42, these related pulses are converted to a D.C. signal of a voltage proportional to the rate of occurrence of the related pulses received by the count rate meter 42. This D.C. signal is passed from one terminal 42A of the count rate meter 42 to terminal 46A of the servo amplifier 46. The other count rate meter 42 terminal 42B is preferably connected to the comparison circuit 43. The reference signal provided by the comparison circuit 43 may be passed through the winding of a potentiometer 47, and sent to the second terminal 46B of the servo amplifier 46. The servo amplifier 46, which is preferably phase-sensitive, may be adapted and connected to the variable phase winding 48, of a suitable two-phase servo motor 50, for the purpose of turning a shaft 50A in a direction and to an extent related to the polarity and magnitude of the difference between the aforementioned D.C. counting rate and reference signals.

The fixed phase winding 51, of the servo motor 50, is preferably connected to receive power from a suitable A.C. source 58 across a condenser 53 which provides such phase-shift as may be found desirable. The A.C. source 58 may also be connected to supply power, through an isolation transformer 55, to a variable transformer 55A which has its adjustable tap 55B connected to shaft 50A through a suitable gear train 52. Thus, the servo motor 50 selects the proper voltage to be applied to the rectifier-filter circuit 59 which, in turn, delivers related D.C. signals to the tap 70C of the low impedance winding of the second balanced line transformer 70 for transmission, via the cable 14, to the aforementioned first balanced line transformer 72.

In order that the network generally depicted in FIG. 4 be stabilized as much as is reasonably possible, the shaft 50A of the servo motor 50 may also be connected through another gear train 80 to drive a source 81 of D.C. voltage 1, such as a tachometer generator, which voltage is proportional to the speed of rotation of the shaft 50A. This output voltage provided by source 81 is preferably connected across the tap 47A and winding of the potentiometer 47 to provide damping of the action of the servo motor 50 by means of feed-back to the servo amplifier 46. The tap 47A may, of course, be adjusted as desired.

Figure 5:
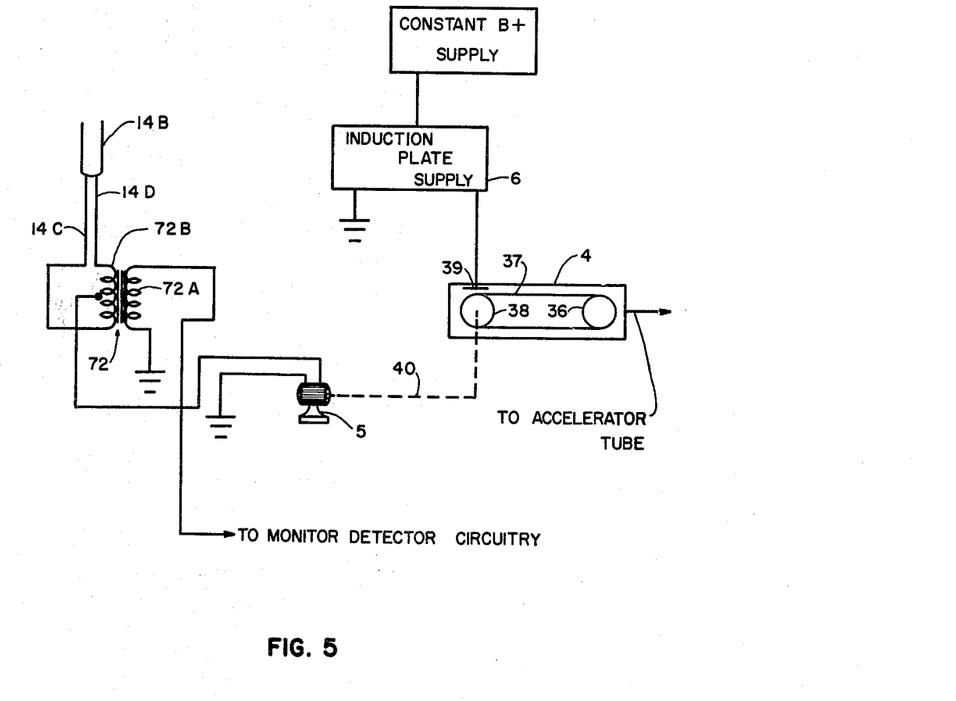
FIG. 5 is a diagrammatic representation of a modified version of the form of the present invention illustrated in FIG. 4.

Returning to the "down-hole" end of the cable 14, the control signal which was applied to the low impedance winding 70B, of the second balanced line transformer 70, may be taken from the related low impedance winding 72B, of the first balanced line transformer 72, by means of its center tap 72C. This control signal may then be connected to the variable induction plate supply 6 to adjust the amount of negative potential being developed on the induction plate 39 in a manner related to the character of the monitor signal being derived from the monitor detector 3. As hereinbefore explained, if the magnitude of the negative potential developed on the induction plate 39 is adjusted, it will effect a corresponding adjustment in the magnitude of the positive potential being developed on the upper pulley 38. Further, the amount of current being delivered to the anode 24 (see FIG. 2) is not only a function of the magnitude of the negative potential established on the induction plate 39, but is also affected by the speed of the belt 37. Thus, as depicted in FIG. 5 the induction plate supply 6 output may (within reasonable limits) be held constant, and the monitor function of the present invention be achieved by using the control signal, from tap 72C, to adjust the speed with which the motor 5 rotates the upper pulley 38 by means of shaft 40. The circuits hereinbefore described may be adapted to function in this manner by connecting the induction pale supply 6 to a fixed source of power, and by applying the control signal from tap 72C only to the motor 5. In addition, as shown in FIG. 4, the control signal may be applied to simultaneously regulat the power outputs of both the motor 5 and the induction plate supply 6 in relative proportions found to be most suitable.

Numerous other modifications and variations of the present invention may be made without departure from the scope and essence of the functions hereinbefore described. Accordingly, it should be clearly understood that those forms of the invention depicted in the figures of the accompanying drawings, and described herein, are illustrative only and are not intended to limit the scope of the present invention.

What is claimed is:
1. In a system for artificially producing radioactivity, said system including
   an ion beam accelerator tube, and
   an electrostatic generator arranged and adapted to supply said tube with a relatively constant accelerating voltage and including an endless belt adapted to carry an energizing electric current to said tube,
   the improvement in combination therewith comprising
      a radiation detector arranged in close proximity to said tube and adapted to provide an electrical signal generally composed of pulses functionally related to radiation incident on said detector,
      comparing means interconnected to receive said electrical signal provided by said detector and adapted to derive a compensating signal systematically related thereto, and
      means interconnected with said comparing means and said generator to adjust the magnitude of said energizing electric current carried by said belt in a manner determined by said compensating signal.

2. In a system for artificially producing radioactivity, said system including
   an ion beam accelerator tube,
   an electrostatic generator arranged and adapted to supply said tube with a relatively constant accelerating voltage and including an endless belt adapted to carry an energizing electric current to said tube, and belt-energizing means connected to said generator,
   the improvement in combination therewith comprising
      a radiation detector arranged in close proximity to said tube and adapted to provide a monitor signal generally composed of electrical pulses functionally related to radiations incident on said detector,
      comparing means interconnected to receive said monitor signal and adapted to derive in response thereto a systematically related compensating signal, and
      means for applying said compensating signal to said belt-energizing means.

3. In a system for artificially producing radioactivity, said system including
   an ion beam accelerator tube,
   an electrostatic generator arranged and adapted to supply said tube with a relatively constant accelerating voltage and including an endless belt adapted to carry an energizing electric current to said tube,
   belt-charging means interconnected with said generator, and
   variable belt-driving means connected to said generator,
   the improvement in combination therewith comprising
      a radiation detector arranged in close proximity to said tube and adapted to provide a monitor signal generally composed of electrical pulses functionally related to radiations incident on said detector,
      comparing means interconnected to receive said monitor signal and adapted to derive therefrom a systematically related compensating signal, and
      means for connecting said compensating signal to said variable belt-driving means.

4. In a system for artificially producing radioactivity, said system including
   an ion beam accelerating tube,
   an electrostatic generator arranged and adapted to supply said tube with a relatively constant accelerating voltage and including an endless belt adapted to carry an energizing electric current to said tube,
   belt-driving means connected to said generator, and
   variable belt-charging means interconnected with said generator,
   the improvement in combination therewith comprising
      a radiation detector arranged in close proximity to said tube and adapted to provide in response to incident radiations a monitor signal generally composed of electric pulses functionally related to said incident radiations,
      comparing means interconnected to receive said monitor signal and adapted to derive therefrom a systematically related compensating signal, and
      means interconnecting said compensating signal to said variable belt-charging means.

5. In a system for artificially producing radioactivity, said system including
   an ion beam accelerating tube,
   an electrostatic generator arranged and adapted to supply said tube with a relatively constant accelerating voltage and including an endless belt adapted to carry an energizing electric current to said tube,
   belt-driving means connected to said generator, and
   belt-charging means interconnected with said generator,
   the improvement in combination therewith comprising
      a radiation detector arranged in close proximity to said tube and adapted to provide a monitor signal generally composed of electrical pulses functionally related to radiations incident on said detector,
      comparing means interconnected to receive said monitor signal and adapted to derive in response thereto a systematically related compensating signal, and
      means for connecting said compensating signal to said belt-driving means and said belt-charging means.

6. In a system for artificially producing radioactivity, said system including
   an ion beam accelerator tube,
   an electrostatic generator arranged and adapted to supply said tube with a relatively constant accelerating voltage and including an endless belt adapted to carry an energizing electric current to said tube, and
   belt-energizing means arranged and adapted to drive said belt and to develop said energizing electric current on said belt,
the improvement in combination therewith comprising
   a radiation detector arranged in close proximity to said tube and adapted to provide in response to incident radiations a monitor signal generally composed of electric pulses functionally related to said incident radiations,
   pulse counting means interconnected with said detector and adapted to establish a count rate signal having a magnitude functionally related to the rate of occurrence of said electric pulses composing said monitor signal,
   comparing means interconnected to receive said count rate signal and adapted to derive in response thereto a compensating signal substantially functionally related to the difference in magnitude between the magnitude of said count rate signal and a reference magnitude, and
   means interconnected between said comparing means and said belt-energizing means and adapted to energize said variable belt-driving means in a manner functionally related to the magnitude of said compensating signal.

7. In a system for artificially producing radioactivity, said system including
   an ion beam accelerator tube,
   an electrostatic generator arranged and adapted to supply said tube with a relatively constant accelerating voltage and including an endless belt adapted to carry an energizing electric current to said tube,
   belt-driving means connected to said generator, and
   belt-charging means interconnected with said generator,
the improvement in combination therewith comprising
   a radiation detector arranged in close proximity to said tube and adapted to provide in response to incident radiations a monitor signal generally composed of electric pulses functionally related to said incident radiations,
   pulse counting means interconnected with said detector and adapted to establish a count rate signal having a magnitude functionally related to the rate of occurrence of said monitor signal pulses,
   comparing means interconnected to receive said count rate signal and adapted to derive in response thereto a compensating signal substantially functionally related to the difference in magnitude between the magnitude of said count rate signal and a reference magnitude, and
   a source of power adapted and arranged to supply said belt-driving means and said belt-charging means in a manner determined by said compensating signal.

8. In a system for artificially producing radioactivity, said system including
   an ion beam accelerator tube,
   an electrostatic generator arranged and adapted to supply said tube with a relatively constant accelerating voltage and including an endless belt adapted to carry an energizing electric current to said tube, and
   variable belt-driving means connected to said generator,
the improvement in combination therewith comprising
   a radiation detector arranged in close proximity to said tube and adapted to provide in response to incident radiations a monitor signal generally composed of electric pulses functionally related to said incident radiations,
   pulse counting means interconnected with said detector and adapted to establish a count rate signal having a magnitude functionally related to the rate of occurrence of said monitor signal pulses,
   comparing means interconnected to receive said count rate signal and adapted to derive in response thereto a compensating signal substantially functionally related to the difference in magnitude between the magnitude of said count rate signal and a reference magnitude, and
   a source of power adapted and arranged to supply said variable belt-driving means in a manner determined by said compensating signal.

9. In a system for artificially producing radio-activity, said system including
   an ion beam accelerator tube,
   an electrostatic generator arranged and adapted to supply said tube with a relatively constant accelerating voltage and including an endless belt adapted to carry an energizing electric current to said tube, and
   variable belt-charging means interconnected with said generator,
the improvement in combination therewith comprising
   a radiation detector arranged in close proximity to said tube and adapted to provide in response to incident radiations a monitor signal generally composed of electric pulses functionally related to said incident radiations,
   pulse counting means interconnected with said detector and adapted to establish a count rate signal, means deriving a compensating signal having a magnitude functionally related to the difference in magnitude between the magnitude of said count rate signal and a reference magnitude, and
   a source of power adapted and arranged to supply said variable belt-charging means in a manner determined by said compensating signal.

10. In a system for artificially producing radioactivity, said system including
   an ion beam accelerator tube,
   an electrostatic generator arranged and adapted to supply said tube with a relatively constant accelerating voltage and including an endless belt adapted to carry an energizing electric current to said tube, and
   variable belt-energizing means interconnected with said generator and including a motor adapted to drive said belt,
the improvement in combination therewith comprising
   a radiation detector arranged in close proximity to said tube and adapted to provide in response to incident radiations a monitor signal generally composed of electric pulses functionally related to said incident radiations,
   pulse counting means interconnected with said detector and adapted to establish a count rate signal having a magnitude functionally related to the rate of occurrence of said monitor signal pulses,
   means providing a reference signal,
   comparing means arranged and adapted to derive a compensating signal substantially functionally related to the difference in magnitude and polarity between said reference signal and said count rate signal,
   a source of power having a variable output connected to said variable belt-energizing means, and control means adapted and arranged to adjust said variable output of said source of power in accordance with the magnitude and polarity of said compensating signal.

11. The improvement described in claim 10 wherein a recording means is interconnected therewith to provide a recorded indication of the count rate signal.

References Cited in the file of this patent

UNITED STATES PATENTS

| | | |
|---|---|---|
| 2,842,695 | Goodman | July 8, 1958 |
| 2,905,826 | Bonner | Sept. 22, 1959 |
| 2,914,677 | Arnold | Nov. 24, 1959 |
| 2,960,610 | Gale | Nov. 15, 1960 |
| 2,963,583 | Lebourg | Dec. 6, 1960 |
| 2,994,776 | Mott | Aug. 1, 1961 |